(12) United States Patent
Murrish et al.

(10) Patent No.: US 8,108,058 B2
(45) Date of Patent: Jan. 31, 2012

(54) METHOD OF ANALYZING COMPOSITE STRUCTURES

(75) Inventors: Richard E. Murrish, Witchita, KS (US); Jerry D. Zayic, Renton, WA (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 12/368,073

(22) Filed: Feb. 9, 2009

(65) Prior Publication Data

US 2010/0204815 A1 Aug. 12, 2010

(51) Int. Cl.
*G06F 19/00* (2006.01)
*G06F 17/50* (2006.01)

(52) U.S. Cl. .................. 700/97; 700/98; 703/1
(58) Field of Classification Search .......... 700/97, 700/98, 182; 703/6; 345/420
See application file for complete search history.

(56) References Cited

U.S. PATENT DOCUMENTS

| | | | | |
|---|---|---|---|---|
| 4,849,913 A * | 7/1989 | Ward et al. | ......... | 700/98 |
| 4,945,488 A * | 7/1990 | Carver et al. | ......... | 700/97 |
| 5,006,990 A * | 4/1991 | Ward et al. | ......... | 700/97 |
| 5,033,014 A * | 7/1991 | Carver et al. | ......... | 703/1 |
| 5,266,021 A * | 11/1993 | Jacobson | ......... | 425/334 |
| 5,573,716 A * | 11/1996 | Jacobson | ......... | 264/40.7 |
| 5,984,511 A * | 11/1999 | Vasey-Glandon et al. | .... | 700/182 |
| 6,007,319 A * | 12/1999 | Jacobson | ......... | 425/140 |
| 6,041,132 A * | 3/2000 | Isaacs et al. | ......... | 382/100 |
| 6,341,261 B1 * | 1/2002 | Vasey-Glandon et al. | .... | 700/182 |
| 6,799,081 B1 * | 9/2004 | Hale et al. | ......... | 700/98 |
| 6,813,749 B2 * | 11/2004 | Rassaian | ......... | 703/7 |
| 7,010,472 B1 * | 3/2006 | Vasey-Glandon et al. | ...... | 700/97 |
| 7,099,725 B2 | 8/2006 | Murrish et al. | | |
| 7,321,804 B2 | 1/2008 | Zayic et al. | | |
| 7,376,480 B2 * | 5/2008 | Hagen et al. | ......... | 700/98 |
| 7,512,527 B2 * | 3/2009 | Nagase | ......... | 703/7 |
| 7,536,235 B2 * | 5/2009 | Hagen | ......... | 700/98 |

(Continued)

FOREIGN PATENT DOCUMENTS

WO    WO 2005/062258 A1    7/2005

OTHER PUBLICATIONS

Hunten, K.; Klintworth, J.; Pitre, N. and Mack, T., New Standards Based Data Exchange "Bridge" for Design (CAD), Analysis (CAE) and Manufacturing (CAM) of Composite Structures, 1999, MSC 1999 Aerospace Users Conference Proceedings, obtained online at www.mscsoftware.com/support/library/conf/avc99.*

(Continued)

*Primary Examiner* — Kakali Chaki
*Assistant Examiner* — Kelvin Booker (57) ABSTRACT

A method is provided for generating a data product that allows for enhanced design, analysis and manufacture of a composite structure comprising a plurality of plies. The method comprises the steps of obtaining geometric ply definitions, inputting the geometric ply definitions into a computer aided manufacturing (CAM) software program to generate a numerically coded tool path definition containing centerline data for each tape or tow comprising a ply, programming tape or tow course shape definitions of a plurality of plies in CAM to produce actual ply definitions, using CAM to generate an accumulated dataset of actual ply definitions, using a customized software program to analyze the dataset to obtain a data product containing results relating to manufacturing implementation of the actual ply definitions, and using the customized software program to evaluate and visualize potential impact of the data product and to interrogate the data product.

18 Claims, 8 Drawing Sheets

U.S. PATENT DOCUMENTS

| | | | |
|---|---|---|---|
| 7,600,979 B2* | 10/2009 | Steibel et al. | 416/230 |
| 7,643,970 B2* | 1/2010 | Drumheller et al. | 700/97 |
| 7,809,454 B2* | 10/2010 | Hu et al. | 700/97 |
| 7,814,110 B2* | 10/2010 | Anelle et al. | 707/754 |
| 7,869,982 B2* | 1/2011 | Drumheller et al. | 700/97 |
| 2005/0025948 A1* | 2/2005 | Johnson et al. | 428/223 |
| 2007/0063378 A1* | 3/2007 | O'Donoghue | 425/388 |
| 2007/0106407 A1* | 5/2007 | Drumheller et al. | 700/96 |
| 2007/0106418 A1* | 5/2007 | Hagen et al. | 700/118 |
| 2008/0006102 A1* | 1/2008 | Engelbart et al. | 73/866 |
| 2008/0124512 A1* | 5/2008 | Steibel et al. | 428/105 |
| 2008/0312764 A1 | 12/2008 | Murrish | |
| 2009/0271156 A1* | 10/2009 | Kageura | 703/1 |
| 2009/0312993 A1* | 12/2009 | Drumheller et al. | 700/97 |
| 2010/0051167 A1* | 3/2010 | Hunter et al. | 156/64 |
| 2010/0191360 A1* | 7/2010 | Napadensky et al. | 700/98 |
| 2011/0029093 A1* | 2/2011 | Bojarski et al. | 623/20.35 |
| 2011/0087332 A1* | 4/2011 | Bojarski et al. | 623/20.32 |

OTHER PUBLICATIONS

Department of Trade and Industry (DTI), "Hybridmat 4: Advances in the Manufacture of 3-D Preform Reinforcement for advanced Structural Composites in Aerospace—A Mission to the USA", Apr. 2006, Report of a DTI Global Watch Mission, obtained online at www.globalwatchservice.com.*

Sharma, S.B.; Porat, I.; Potluri, P. and Atkinson, J., "Manufacturing of Doubly Curved Tubular Composite Structures: Mapping and Weave Modifications", 2002, Journal of Thermoplastic Composite Materials 2002; 15; 209, DOI: 10.1177/0892705702015003448.*

* cited by examiner

METHOD OF ANALYZING COMPOSITE STRUCTURES

BACKGROUND

1) Field

The disclosure relates to methods in the design and manufacture of composite structures and parts, and in particular, relates to a composite stack analysis method for use in the design and manufacture of composite structures and parts that evaluates the interactions of plies at the design and manufacture levels.

2) Description of Related Art

Composite structures and parts are used extensively in aircraft, aerospace, and other applications in which materials having a high strength-to-weight ratio are necessary. Composite structures may be manufactured, either manually or using an automated apparatus, by progressively building up the structure with a plurality of layers of thin composite tape or tow (i.e., untwisted bundles of continuous filaments, such as carbon or graphite fibers, preimpregnated with a thermoset resin material such as epoxy) laid one layer upon another and laminated together. These layers are often referred to as partial or full plies. For large structures exceeding the available material widths, or designs that can benefit greatly from unidirectional stress paths, each ply layer is typically made up of multiple tape strips or tow courses of material placed near or abutting edge-to-edge next to each other or overlapped to some extent. In order to analyze the ply as if it were one continuous piece, it is generally advantageous to reduce the gap and overlap distances or tolerances between the tape strips or tow courses. For example, in certain relatively high technology industries such as the aerospace industry, the gap distance may be held to 0.10 inch or less.

Prior to the actual manual or automated manufacturing of the composite structure, the composite structure comprised of partial or full plies is typically designed with computer aided design (CAD) or computer aided manufacturing (CAM) applications at the design stage. CAD or CAM geometric manipulation may be used to form a surface representation or rendering of the tool on which the composite structure will be formed. Other CAD or CAM surfaces or sheet solids may be used to represent the plies that make up layers of the composite structure.

Known composite design specifications and methods allow for imperfections, such as gaps and overlaps in coverage, at the ply level, but such known specifications and methods do not provide adequate information concerning the detrimental effects that concentrating such imperfections and gap or overlap groupings near each other might have as composite structures are created with multiple layers. Allowable deviations from known design definitions are covered at the ply level by manufacturing specifications. However, known methods do not provide information to compare the cumulative effect such allowable deviations might have at the laminate or stacked level and do not provide information to evaluate the actual tape or tow distribution occurring at the ply level in relation to the plies below and above it in a composite stack or laminate. This can result in composite structures being overdesigned to compensate for potential flaws which results in increased cost and weight. This additional weight reduces the usable payload of the aircraft and decreases fuel efficiency which increases the product operating cost. In addition, the current methods make dimensional tolerance of the stack-up thickness more difficult to predict or control increasing the potential for problems when interfacing to related structures.

Accordingly, it is desirable to provide a method for composite stack analysis for use in the design and manufacture of composite structures that can provide advantages over known methods.

SUMMARY

This need for a method for composite stack analysis for use in the design and manufacture of composite structures is satisfied and numerous advantages are discussed herein. Embodiments of the method may provide one or more of the following advantages: provides a method for evaluating the actual tow or tape distribution occurring at the ply level in relation to all of the plies below and above it in a composite stack or laminate; provides a method for analyzing a composite structure for concentrations of imperfections or deviations from theoretical designs in a stack of plies or laminate that can impact overall functionality but be allowable by specifications at the individual ply level; provides a method that can improve composite structure design and manufacture, which in turn, can improve functional characteristics of composite structures used as structural components in aircraft and other structures, resulting in improved strength, reduced weight, better appearance, and consistency of production; provides a method for determining the impact of manufacturing implementations of a design in a composite stack-up and for analyzing the progressive build-up of the manufacturing definitions of plies; provides a method for analyzing the interactions of plies in a composite stack-up at the detailed design and manufacturing level; provides a method that can allow for implementation of changes to the design and manufacture of composite structures early in the production environment; provides a method that can generate data allowing concurrent production environments to enhance the overall design, analysis and manufacturing aspects of composite structures; provides a method for optimization of composite structure designs that are manufactured using automated fiber placement or tape laying techniques, and that may be used in such structures as aircraft, spacecraft, watercraft, military craft, automobiles, trucks, buses, ships, bridges, rotor blades for aircraft, rotor blades for power generation, and other suitable structures.

In one embodiment of the disclosure there is provided a method using a computer for generating a data product that allows for enhanced design, analysis and manufacture of a composite structure comprising a plurality of plies. The method comprises the step of obtaining geometric ply definitions from an engineering source. The method further comprises the step of inputting the geometric ply definitions into a computer aided manufacturing (CAM) software program to generate a numerically coded tool path definition containing centerline data for each tape or tow course comprising a ply. The method further comprises the step of programming tape or tow course shape definitions of a plurality of plies in the computer aided manufacturing (CAM) software program to produce a plurality of actual ply definitions as strips of tape or tow courses. The method further comprises the step of using the computer aided manufacturing (CAM) software program to generate an accumulated dataset of actual ply definitions. The method further comprises the step of using a customized software program to analyze the dataset to obtain a data product containing results relating to manufacturing implementation of the actual ply definitions. The method further comprises the step of using the customized software program to evaluate and visualize potential impact of the data product. The method further comprises the step of using the customized software program to interrogate the data product in order to enhance design, analysis and manufacture of the composite structure.

In another embodiment of the disclosure, there is provided a method using a computer for generating a data product that allows concurrent production environments to enhance design, analysis and manufacture of a composite structure comprising one or more plies. The method comprises the step of obtaining geometric ply definitions from an engineering source. The method further comprises the step of inputting the geometric ply definitions into a computer aided manufacturing (CAM) software program to generate a numerically coded tool path definition containing centerline data for each tape or tow comprising a ply. The method further comprises the step of programming tape or tow course shape definitions of a plurality of plies in the computer aided manufacturing (CAM) software program to produce a plurality of actual ply definitions as strips of tape or tow. The method further comprises the step of using the computer aided manufacturing (CAM) software program to generate an accumulated dataset of actual ply definitions. The method further comprises the step of inputting the dataset into a customized software program to obtain a data product containing results relating to manufacturing implementation of the actual ply definitions. The method further comprises the step of using the customized software program to evaluate and visualize potential impact of the data product. The method further comprises the step of using the customized software program to visualize a simulation of a build process of the composite structure at a detailed ply level. The method further comprises the step of using the customized software program to analyze interactions of the actual ply definitions in a composite stack. The method further comprises the step of using the customized software program to evaluate the actual ply definitions against actual tape or tow distribution occurring at a ply level in relation to all plies above and below the ply level in a composite stack. The method further comprises the step of using the customized software program to determine any detrimental effects resulting from random concentrations of allowable manufacturing deviations in a composite stack containing a plurality of plies. The method further comprises the step of using the customized software program to interrogate the data product in order to enhance design, analysis and manufacture of the composite structure. The method further comprises the step of repeating the steps of the method until an optimal data product is obtained. The method further comprises the step of updating as-designed geometric ply definitions.

In another embodiment of the disclosure, there is provided a method using a computer for analyzing interactions of plies in a composite structure. The method comprises the step of inputting theoretical ply definitions into a computer aided manufacturing software program to generate output data comprising tape or tow course definitions of a plurality of plies. The method further comprises the step of programming the tape or tow course definitions in the computer aided manufacturing (CAM) software program to produce a plurality of actual ply definitions. The method further comprises the step of using the computer aided manufacturing (CAM) software program to generate an accumulated dataset of actual ply definitions. The method further comprises the step of inputting the dataset into a customized software program to obtain one or more characteristics relating to manufacturing implementation of the actual ply definitions. The method further comprises the step of using the customized software program to evaluate and visualize potential impact of the manufacturing implementation in terms of the one or more characteristics. The method further comprises the step of using the customized software program to interrogate the one or more characteristics in order to enhance design, analysis and manufacture of the composite structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The method of the disclosed embodiments may be used in connection with the design and manufacture of composite structures and parts for use in various applications, including but not limited to, aircraft, spacecraft, watercraft, military craft, automobiles, trucks, buses, ships, bridges, rotor blades for aircraft, rotor blades for power generation such as wind, and other suitable structures and parts. Accordingly, one of ordinary skill in the art will recognize and appreciate that the method of the disclosure can be used in any number of applications involving the design and manufacture of composite structures and parts.

Figure 1:
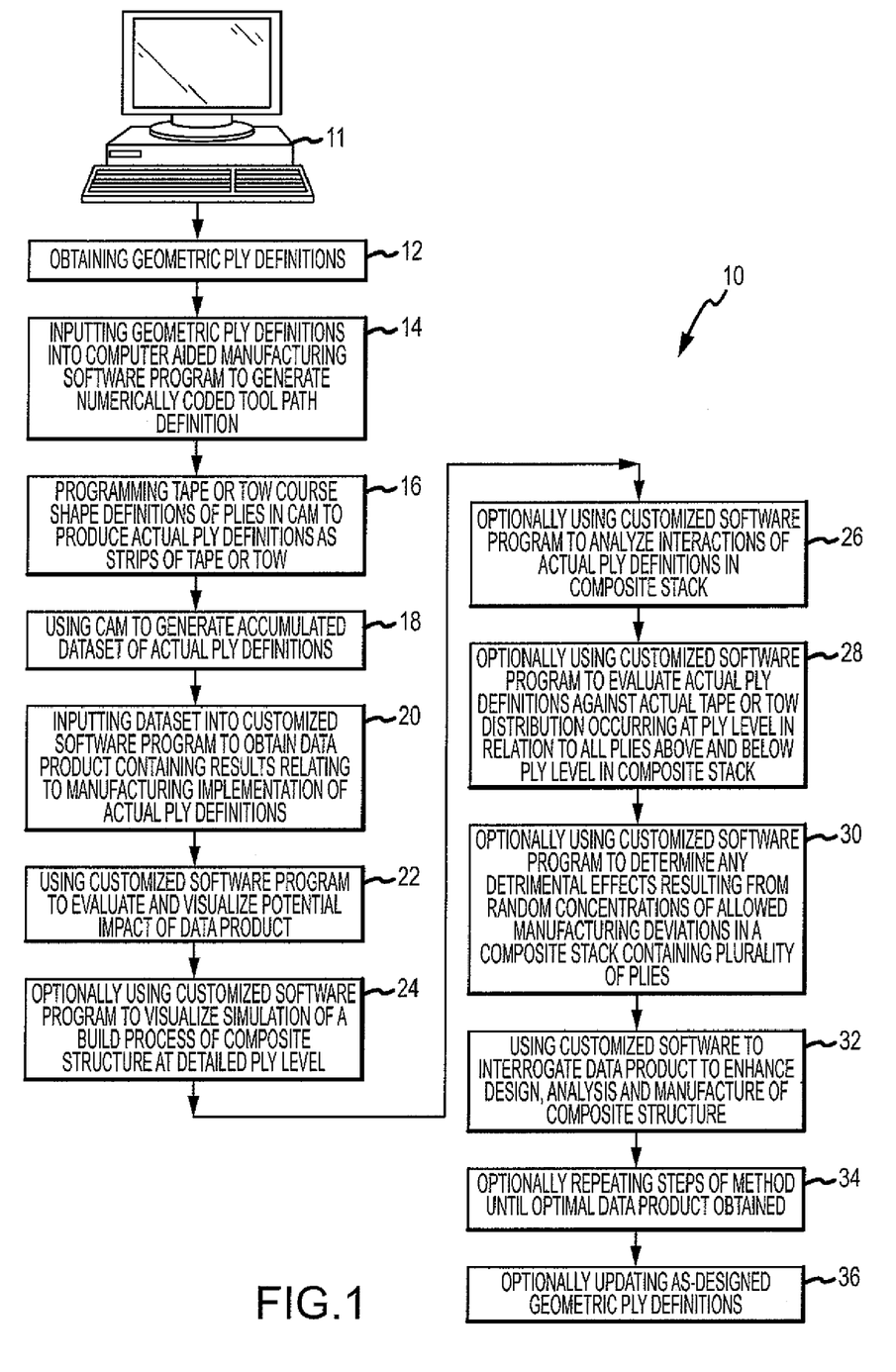
FIG. 1 is a block flow diagram of the steps of an embodiment of the method of the disclosure.
Figure 2:
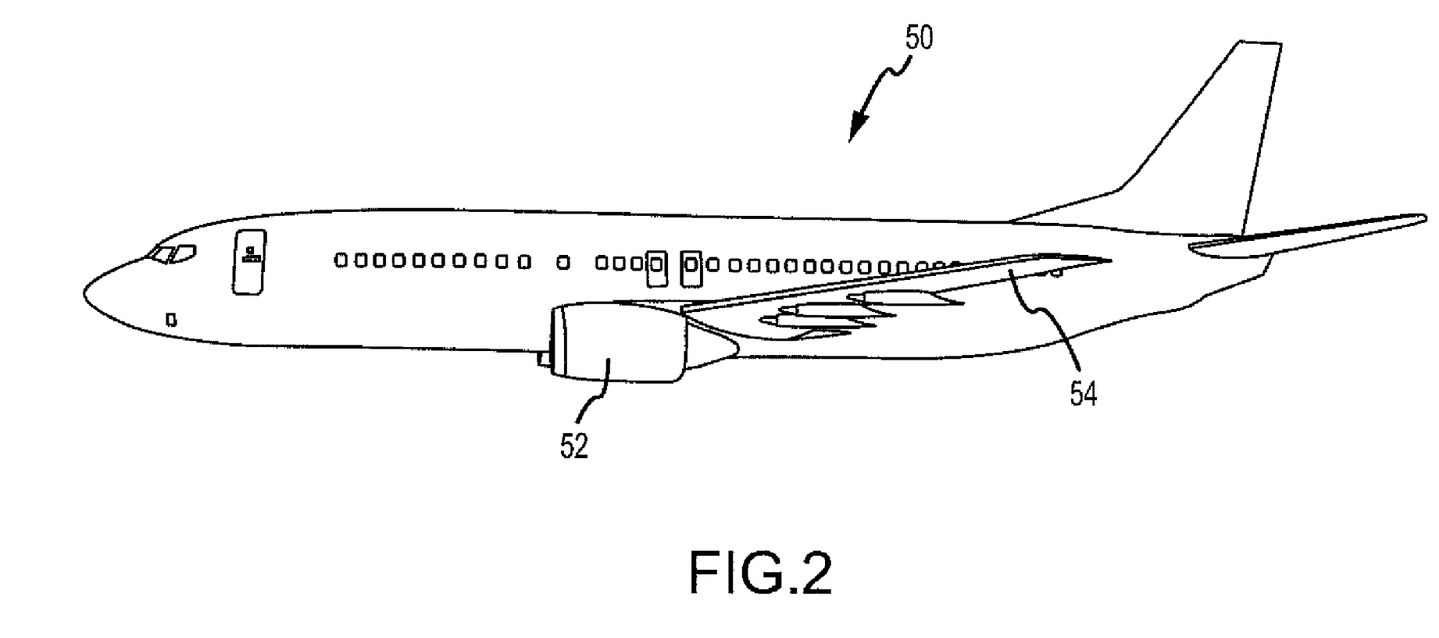
FIG. 2 is an illustration of an aircraft having composite structures or parts made by embodiments of the method of the disclosure.

Referring now to the drawings, FIG. 1 shows a block flow diagram of the steps of an embodiment of a method 10 for using a computer 11 to generate a data product that allows concurrent production environments to enhance design, analysis and manufacture of a composite structure or part. The computer may comprise a pre-programmed general purpose computer, such as a desktop computer, a laptop computer, a personal computer, a networked computer, or another suitable computer. The composite structure may be used in aircraft, spacecraft, watercraft, military craft, automobiles, trucks, buses, ships, bridges, rotor blades for aircraft, rotor blades for power generation, or another suitable vehicle or structure. FIG. 2 is an illustration of an aircraft 50 having composite structures or parts such as an engine 52, a wing 54, or other parts made by embodiments of the method. Composite structures provide high specific strength and stiffness and resistance to damage by fatigue loading, coupled with corrosion resistance and low weight. These factors offer optimal potential for economic savings associated with reduced maintenance and fuel consumption. Preferably, the composite structure or part is comprised of one or more plies, and each of the plies is preferably comprised of one or more tape strips or tow courses. Tows are preferred on areas of high curvature areas because they wrap around the curves more easily. Tape is preferred for flat areas because production rates can be increased by laying down composite material more quickly (typically measured in pounds per hour of material laid down). The width of tow that may be used is typically ⅛ inch, ¼ inch, ½ inch, or another suitable width. Multiple tows may then be collected together into a "course" that is related to a single centerline. Tow courses can be any even number of tows wide. For example, twenty-four (24), ¼ inch tows may lay down as a single six (6) inch wide course. The width of tape that may be used is typically 3 inches, 6 inches, 12 inches, or another suitable width.

Figure 3:
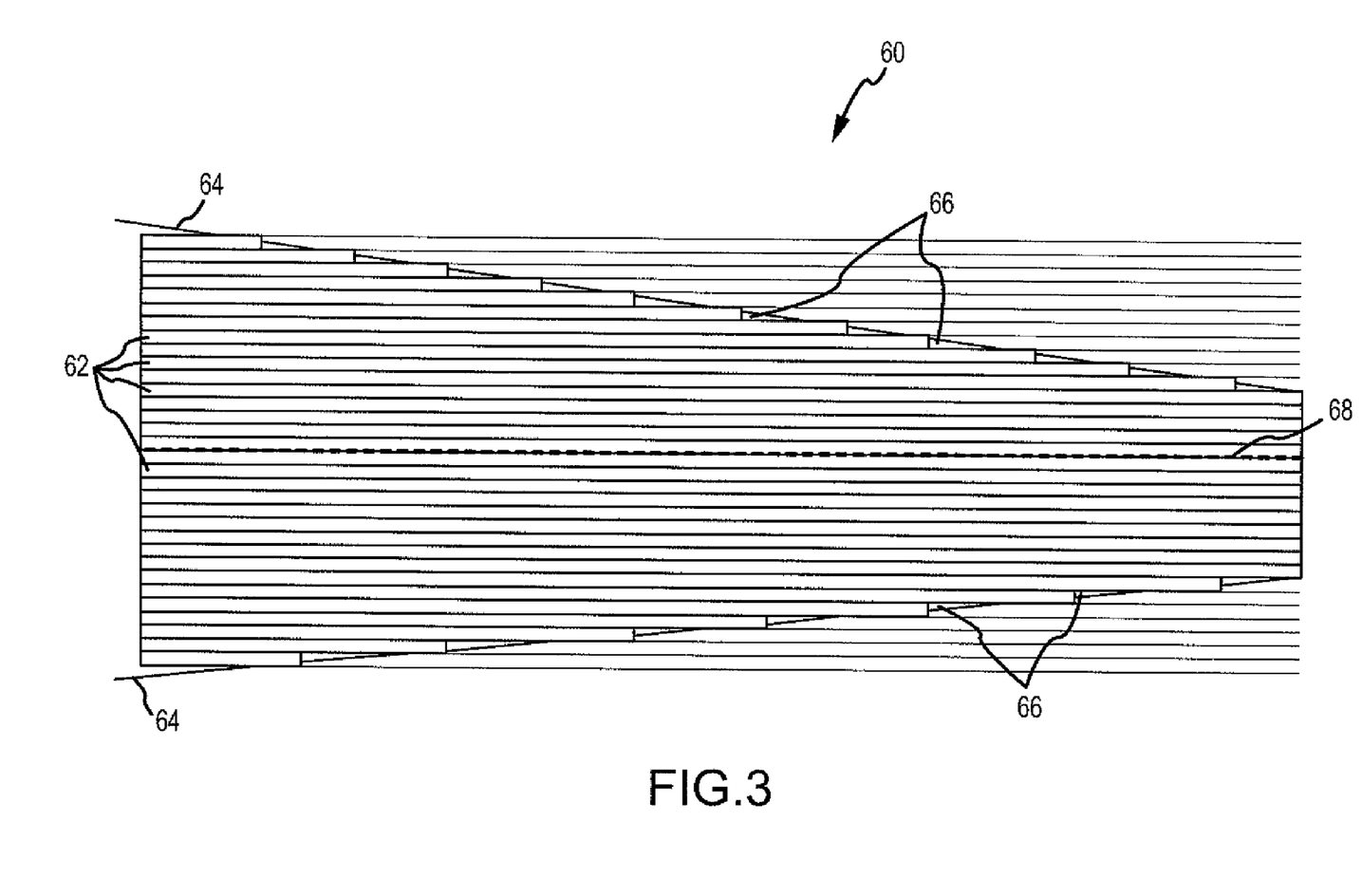
FIG. 3 is an illustration of a top plan view of a computer rendering of a tapered tow course comprised of individual tows.

FIG. 3 is an illustration of a top plan view of a computer rendering of a tapered tow course 60 comprised of individual tows 62 (FIG. 3 shows 32 individual tows). When flattened out, the individual tows may be dropped when they overlap adjacent course boundary lines 64 by a percentage that may range from 0% to 100%. As illustrated in FIG. 3, a 50% value was used to form the tapered tow course 60. The course boundary lines 64 are preferably obtained from geometric or theoretical course definitions which are, in turn, obtained by subdividing the theoretical ply geometry. Gaps 66 are formed at the boundary lines 64. A centerline 68 divides the tapered section 60.

Figure 4:
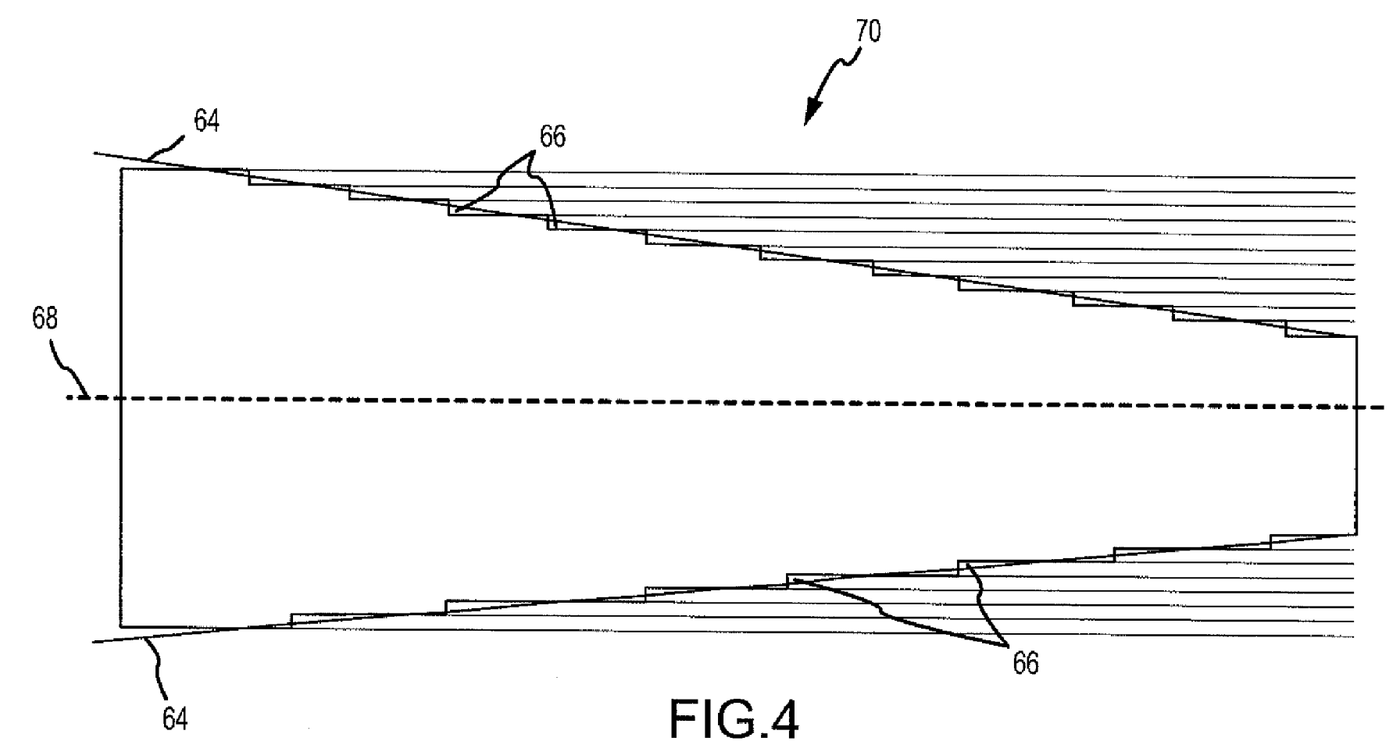
FIG. 4 is an illustration of a top plan view of a computer rendering of a single tow course shape.

FIG. 4 is an illustration of a top plan view of a computer rendering of the perimeter of a single tow course shape 70. The individual tows may be collected and represented by the single tow course shape 70 or surface split. The single tow course shape represents a collective set of tows. The single tow course shape is between course boundary lines 64 obtained from geometric or theoretical course definitions. Gaps 66 may be formed at the boundary lines 64. A centerline 68 divides the single tow course shape 70 but is not necessarily centered on the course. Tows do not necessarily have to be distributed symmetrically.

The method 10 comprises step 12 of obtaining geometric ply definitions or theoretical ply definitions from an engineering source. The geometric or theoretical ply definitions may be defined using commercial off-the-shelf (COTS) composite design software, and such software may be obtained from, for example, Dassault Systemes from France (CATIA—Computer Aided Three-Dimensional Interactive Application; Composite Workbench), Vistagy, Inc. of Waltham, Mass. (FiberSim), Unigraphics Solutions, Inc. (PACKS), or other suitable sources. CATIA is a multi-platform CAD/CAM/CAE (computer aided design/computer aided manufacturing/computer aided engineering) commercial software suite. The method 10 further comprises step 14 of inputting the geometric ply definitions into a computer aided manufacturing (CAM) software program, such as a COTS CAM software program, to generate a numerically coded tool path definition containing centerline data (see reference number 68 in FIGS. 3, 4) for each tape or tow course comprising a ply, and preferably along with the related drop or activation status for each tow at each centerline location. Preferably, the numerically coded tool path definition contains data for each tape or tow course required to cover the geometric or theoretical ply shape within the gap and overlap limits of the manufacturing specification being used. The plies may be converted to numerically coded tool path definitions by known software developed by machine tool developers such as Ingersoll, Cincinnati Lamb, ElectoImpact, and other sources. The data is typically sent to a custom numerically coded controller to drive the tow or tape placement equipment. The method 10 further comprises step 16 of programming tape or tow course shape definitions of a plurality of plies in the computer aided manufacturing (CAM) software program, such as the COTS CAM software program, to produce a plurality of actual or as-manufactured ply definitions as strips of tape or tow courses. The software used by manufacturing to generate tape or tow courses is generally commercial off-the-shelf (COTS) software. The tape or tow course definitions are programmed to produce portions of the actual ply definition. Multiple tape or tow course shape definitions are typically required to represent an entire ply. This can occur as an integral part of the inputting step 14. The numerically coded tool path not only contains the centerline data but also specific information about which tapes or tows are being laid down at a specific point. The method 10 further comprises step 18 of using the computer aided manufacturing (CAM) software program to generate an accumulated or progressive build-up of a dataset of actual or as-manufactured ply definitions. The method 10 further comprises step 20 of using a customized software program to analyze the dataset to obtain a data product containing results relating to manufacturing implementation of the actual ply definitions. The results relating to manufacturing implementation preferably comprise characteristics such as stress, density, porosity, appearance, actual thickness and designed thickness, at a point or over a specified area, or other suitable characteristics. Once the actual tape or tow course shape geometries are imported back into a computer aided design (CAD) system (such as CATIA), the customized software program may be used to analyze the results for specific geometric qualities, such as gaps, overlaps, bumps, holes, or other geometric qualities. The customized software program may be customized from COTS CAD, CAD, or another suitable software program, and may be used alone or in combination with a computer aided design (CAD) software program, such as a COTS CAD software program, CATIA, or another suitable CAD software program. The results of the geometric analysis can then be moved on to secondary processing related to important physical characteristics like density, porosity, stress distributions, and other suitable characteristics. The method may be based on analyzing multiple "core samples" on a composite stack. For purposes of this application, a core sample is a standard composite interrogation process used to visualize which plies can be pierced by a vector penetrating normal through a composite stack. In the subject disclosure, the core sample technique has been modified to visualize which tows or tapes are being intersected. The method takes each of the centerline outputs and combines them into a dataset containing all of the stacked manufacturing information and creates software to analyze the definition for any number of positive or negative characteristics. The method 10 further comprises step 22 of using the customized software program to evaluate and visualize potential impact of the data product. The step may further evaluate and visualize potential impact of the manufacturing implementation in terms of the characteristics, such as stress, density, porosity, appearance, actual thickness versus designed thickness, or other suitable characteristics. The customized software program may be used alone or in combination with a computer aided design (CAD) software program, such as a COTS CAD software program, CATIA, or another suitable CAD software program. Visualizing or graphical techniques that may be used may involve color coding areas for the characteristic being analyzed or interrogated. For example, the color red may be used as an indicator in areas of low density, the color green may be used as an indicator areas of nominal density, and the color yellow may be used as an indicator in areas of high density. Such techniques used may also depend on processing time. The step of using the customized software program to evaluate and visualize potential impact of the data product may comprise using the customized software program to evaluate and visualize gap and overlap distribution within the to-be manufactured or actual ply definitions.

Figures 5, 5A:
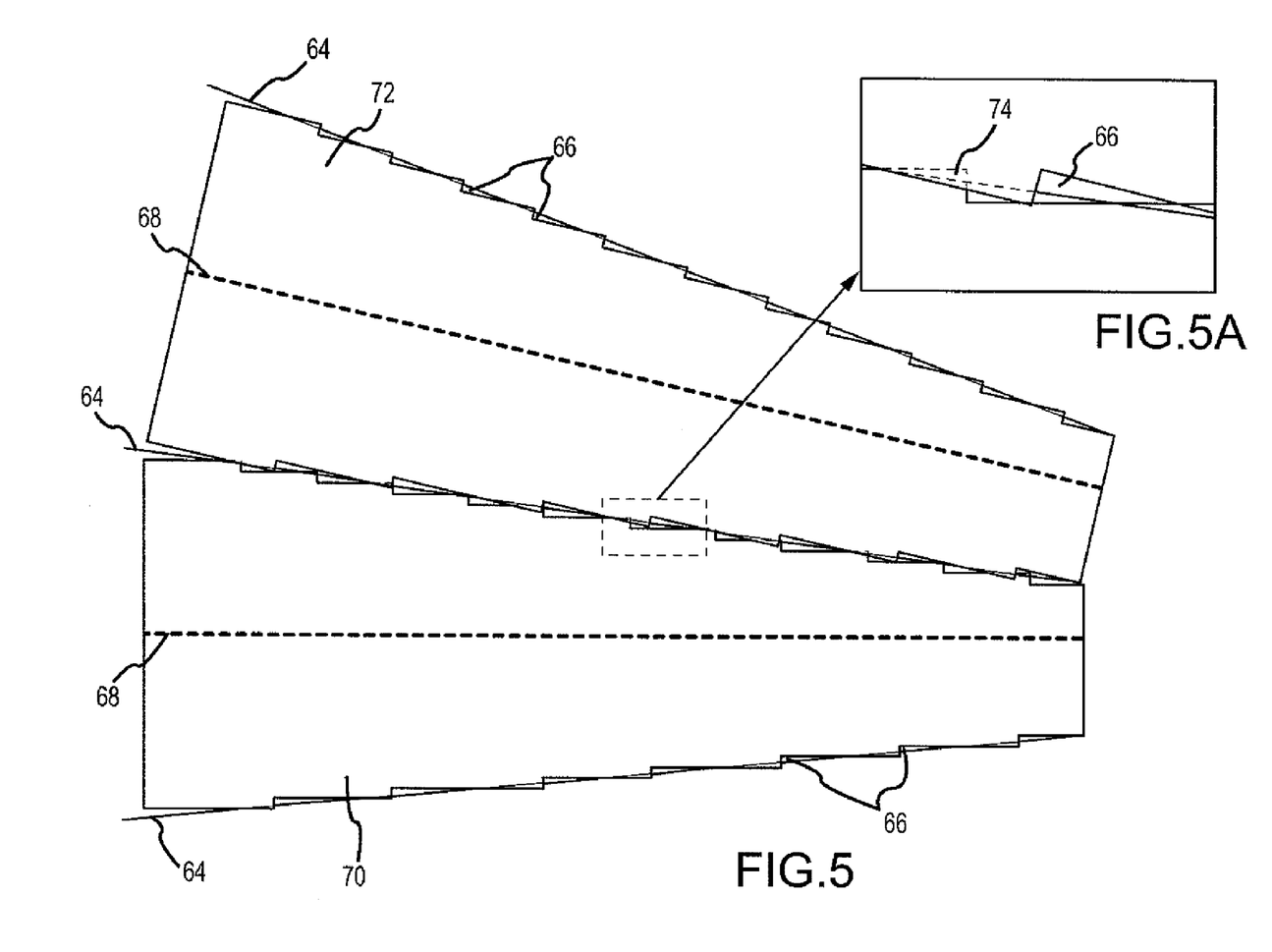
FIG. 5 is an illustration of a top plan view of a computer rendering of two single tow course shapes having gaps and overlaps.
FIG. 5A is an illustration of a close-up of a portion of gaps and overlaps of FIG. 5.
Figure 6:
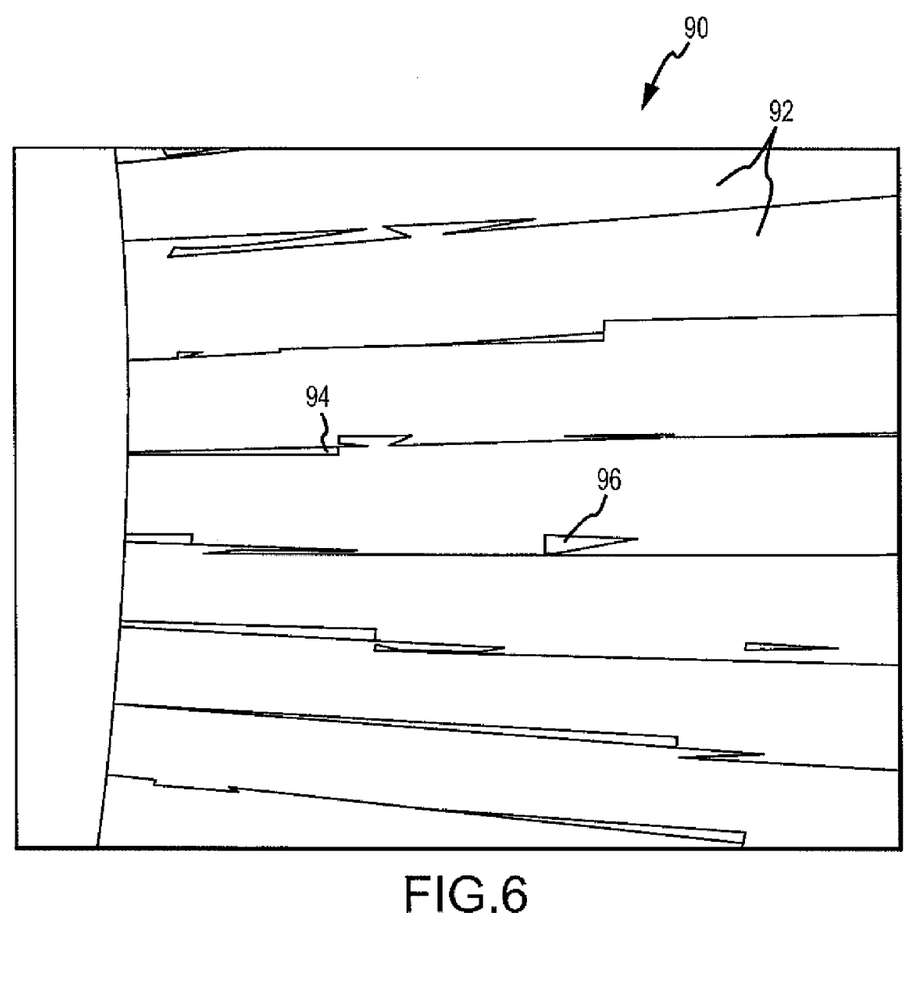
FIG. 6 is an illustration of a computer rendering of an actual aircraft forward fuselage part with gaps and overlaps within the plies.
Figure 7:
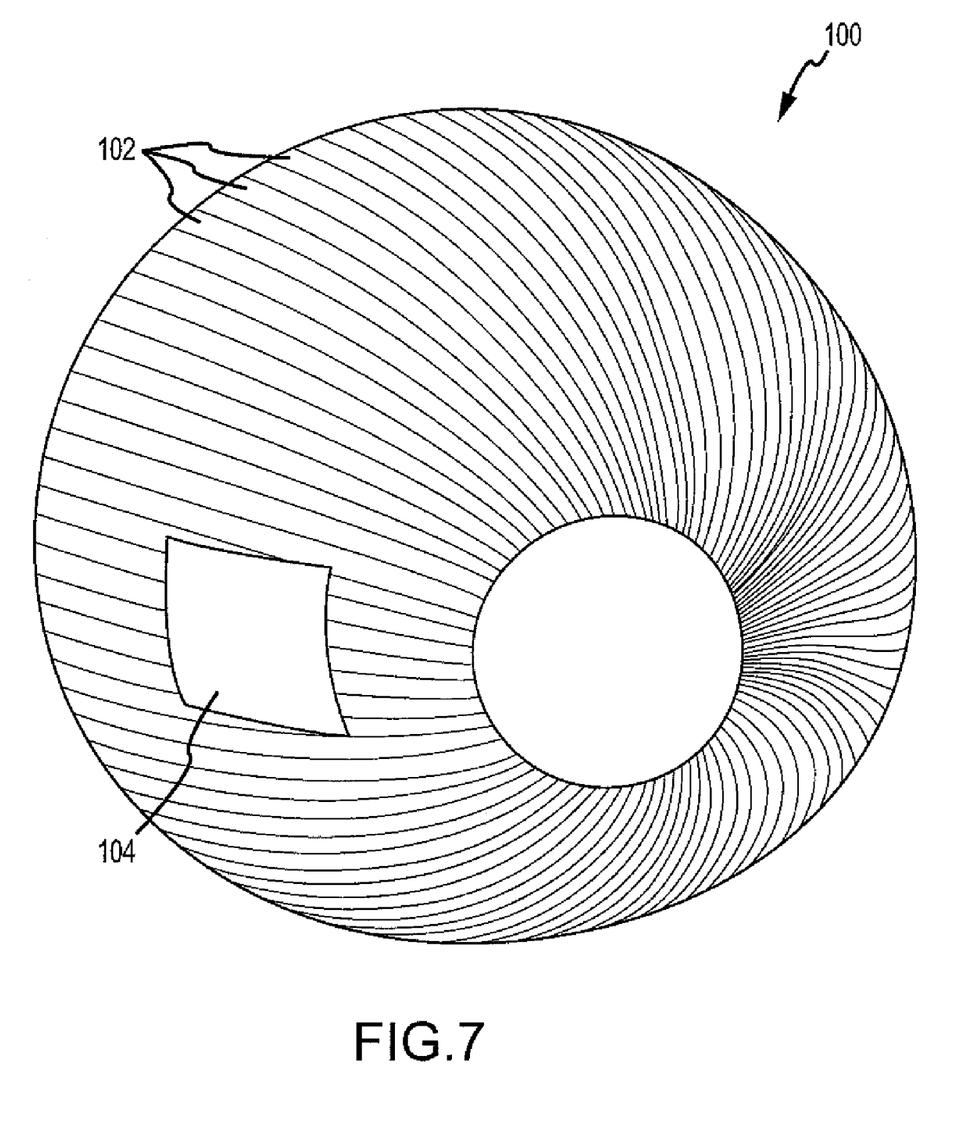
FIG. 7 is an illustration of a perspective view of a typical aircraft forward fuselage part showing multiple tow courses representing a single ply and having a cut-out portion for landing gear; and, FIG. 8 is an illustration of a perspective view of another typical aircraft forward fuselage part showing one ply represented by a set of tow courses defined in one direction overlapping another ply defined by tow courses in an offset direction.
Figure 8:
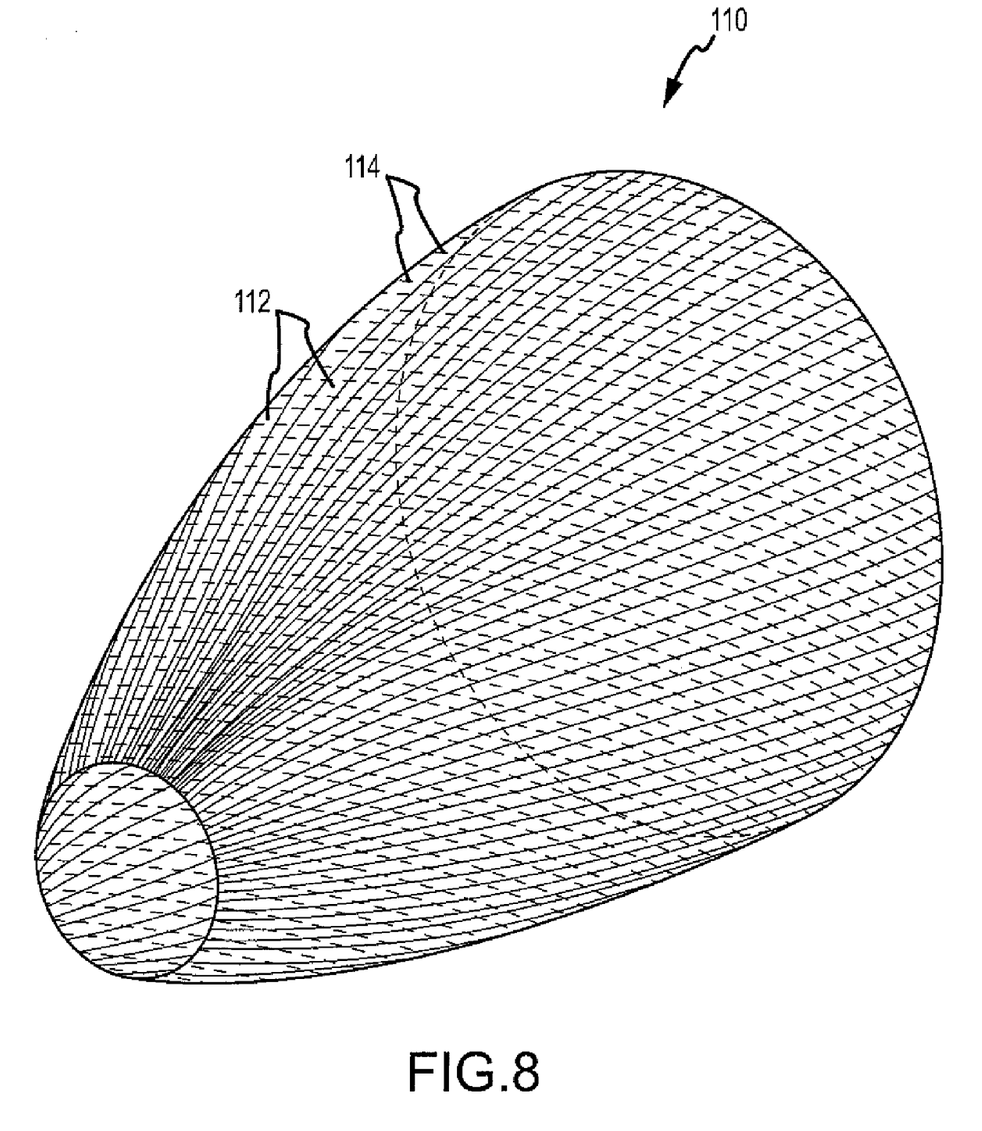

The gaps and overlaps for each course within a ply definition may be visualized. FIG. 5 is an illustration of a top plan view of a computer rendering of two single tow course shapes 70, 72 having gaps 66 and overlaps 74. The single tow course shapes 70, 72 are between course boundary lines 64 obtained by subdividing the theoretical ply definitions. Centerline 68 divides each of the single tow course shapes 70, 72. FIG. 5A is an illustration of a close-up of a portion of gaps and overlaps of FIG. 5. The visualization may be extended to a stack-up view of all the course definitions to analyze areas of interest. FIG. 6 is an illustration of a computer rendering of an actual aircraft forward fuselage part 90 comprised of plies 92 having gaps 94 and overlaps 96 between the plies. FIG. 7 is an illustration of a perspective view of a typical aircraft forward fuselage part 100 showing multiple tow courses representing a single ply 102 and having a cut-out portion 104 for landing gear. FIG. 8 is an illustration of a perspective view of another typical aircraft forward fuselage part 110 showing one ply represented by a set of tow courses defined in one direction 112 overlapping another ply defined by tow courses in an offset direction 114. For most aircraft parts, the stack-up of plies or laminate can be 10 to 500 plies thick and each may have from 1 to 200 tow courses or tape strips or segments. The plies may be oriented in many different directions, and the method allows for analysis of the interactions of the plies and the gaps and overlaps in the composite stack-up. The method may be used to identify any "zipper" type effects in the alignment of gaps in composite structures that could result in loss or damage to the composite structures.

Optionally, the method 10 may comprise step 24 of using the customized software program to visualize a simulation of a build process of the composite structure at a detailed ply level. This may comprise visualizing the simulation of the build process on a computer screen. The customized software program may be used alone or in combination with a computer aided design (CAD) software program, such as a COTS CAD software program, CATIA, or another suitable CAD software program. Optionally, the method 10 may comprise step 26 of using the customized software program to analyze interactions of the actual ply definitions in a composite stack. This may comprise computer analysis of the interactions or interrelationships of the actual ply definition data. The customized software program may be used alone or in combination with a computer aided design (CAD) software program, such as a COTS CAD software program, CATIA, or another suitable CAD software program. Optionally, the method 10 may comprise step 28 of using the customized software program to evaluate the actual ply definitions against actual tape or tow distribution occurring at a ply level in relation to all plies above and below the ply level in a composite stack. This may be a slight deviation from the technique where core sampling may be limited to the areas of thickness that are of interest. The customized software program may be used alone or in combination with a computer aided design (CAD) software program, such as a COTS CAD software program, CATIA, or another suitable CAD software program. Optionally, the method 10 may comprise step 30 of using the customized software program to determine any detrimental effects resulting from random concentrations of allowable manufacturing deviations in a composite stack containing a plurality of plies. This step may involve obtaining the data, visualizing the data, and taking the characteristics being investigated (porosity, density, etc.) and adding developed software or COTS software that can analyze the effects that may result. Various effects modules may be plugged into or connected to the same base layer of software that would determine a numerically significant value for each core sample and evaluate potential detrimental effects based on testing done in a lab. The customized software program may be used alone or in combination with a computer aided design (CAD) software program, such as a COTS CAD software program, CATIA, or another suitable CAD software program.

The method 10 further comprises step 32 of using the customized software program to interrogate the data product or results in order to enhance the design, analysis and/or manufacture of the composite structure. Once preferred color coded visualization elements or maps of the structural part are made, designers or numerically coded programmers may visualize changes to the definition or manufacturing process to eliminate the problem areas or at least bring them within acceptable limits. The customized software program may be used alone or in combination with a computer aided design (CAD) software program, such as a COTS CAD software program, CATIA, or another suitable CAD software program. Optionally, the method 10 may further comprise step 34 of repeating or reiterating the steps of the method until an optimal data product or result is obtained. Once the new definition for the plies or numerically coded paths are completed, the steps of the method may be repeated until satisfactory color coded maps or another suitable evaluation technique is used, such as spreadsheets, stress analysis, and the like, are obtained. Optionally, the method 10 may further comprise step 36 of updating the as-designed ply definitions or any portion of the manufacturing process. In order to update the design definitions, the CAD or numerically coded system may be used and the changes may be made manually or via another suitable method.

Additional features of the method once the data product is obtained may include a means to ensure structural integrity; a means to achieve weight savings in composites such as the use of different algorithms within the numerically coded software to drop tows slightly earlier and save weight means to reduce scrap rate in the factory; a means to obtain better fiber orientation data for stress that might result from an ability to "steer" the laydown of material which has the benefit of the visualization; and a means to compare what composite was actually laid down versus what was programmed in manufacturing and what was designed in engineering.

The disclosure provides embodiments of a method for determining the impact of manufacturing implementations of a design in a composite stack-up and for analyzing composite structures for concentrations of imperfections/deviations from theoretical design in the laminate (stacking of plies) that might impact overall functionality but be allowable by specifications at the individual ply level. When fully implemented, the method can generate data allowing concurrent production environments to enhance the overall design, analysis and manufacturing aspects of composite structure. The data may be analyzed for various characteristics that may be important for design or structural integrity of the composite structure or part. By identifying the distribution of imperfections, the cost and weight related to the design and manufacture of the composite structures or parts can be reduced.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. A method using a computer for generating a data product that allows for enhanced design, analysis and manufacture of a composite structure comprising a plurality of plies, the method comprising the steps of:
    obtaining as-designed geometric ply definitions from an engineering source;
    inputting the as-designed geometric ply definitions into a computer aided manufacturing (CAM) software program to generate a numerically coded tool path definition containing centerline data for each tape or tow course comprising a ply;
    programming tape or tow course shape definitions of a plurality of plies in the computer aided manufacturing (CAM) software program to produce a plurality of as-manufactured ply definitions as strips of tape or tow courses;
    using the computer aided manufacturing (CAM) software program to generate an accumulated dataset of as-manufactured ply definitions;
    using a customized software program to analyze the dataset to obtain a data product containing results relating to manufacturing implementation of the as-manufactured ply definitions;
    using the customized software program to evaluate and visualize potential impact of the data product;
    using the customized software program to interrogate the data product in order to enhance design, analysis and manufacture of the composite structure; and,
    using the customized software program to evaluate the as-manufactured ply definitions against actual tape or tow distribution occurring at a ply level in relation to all plies above and below the ply level in a composite stack.

2. The method of claim 1 further comprising after the step of using the customized software program to evaluate and visualize, the step of using the customized software program to analyze interactions of the as-manufactured ply definitions in a composite stack.

3. The method claim 1 further comprising after the step of using the customized software program to evaluate and visualize, the step of using the customized software program to determine any detrimental effects resulting from random concentrations of allowable manufacturing deviations in a composite stack containing a plurality of plies.

4. The method of claim 1 further comprising after the step of using the customized software program to evaluate and visualize, the step of using the customized software program to visualize a simulation of a build process of the composite structure at a detailed ply level.

5. The method of claim 1 further comprising after the using the customized software program to interrogate step, the step of repeating the steps of the method until an optimal data product is obtained.

6. The method of claim 1 wherein the customized software program is used with a computer aided design (CAD) software program.

7. The method of claim 1 wherein the results relating to manufacturing implementation comprise characteristics selected from the group comprising stress, density, porosity, appearance, and actual thickness versus designed thickness.

8. The method of claim 1 wherein the composite structure is used in aircraft, spacecraft, watercraft, military craft, automobiles, trucks, buses, ships, rotor blades for aircraft, rotor blades for power generation, and bridges.

9. A method using a computer for generating a data product that allows concurrent production environments to enhance design, analysis and manufacture of a composite structure comprising one or more plies, the method comprising the steps of:
    obtaining as-designed geometric ply definitions from an engineering source;
    inputting the as-designed geometric ply definitions into a computer aided manufacturing (CAM) software program to generate a numerically coded tool path definition containing centerline data for each tape or tow comprising a ply;
    programming tape or tow course shape definitions of a plurality of plies in the computer aided manufacturing (CAM) software program to produce a plurality of as-manufactured ply definitions as strips of tape or tow;
    using the computer aided manufacturing (CAM) software program to generate an accumulated dataset of as-manufactured ply definitions;
    inputting the dataset into a customized software program to obtain a data product containing results relating to manufacturing implementation of the as-manufactured ply definitions;
    using the customized software program to evaluate and visualize potential impact of the data product;
    using the customized software program to visualize a simulation of a build process of the composite structure at a detailed ply level;
    using the customized software program to analyze interactions of the as-manufactured ply definitions in a composite stack;
    using the customized software program to evaluate the as-manufactured ply definitions against actual tape or tow distribution occurring at a ply level in relation to all plies above and below the ply level in a composite stack;
    using the customized software program to determine any detrimental effects resulting from random concentrations of allowable manufacturing deviations in a composite stack containing a plurality of plies;
    using the customized software program to interrogate the data product in order to enhance design, analysis and manufacture of the composite structure;
    repeating the steps of the method until an optimal data product is obtained; and,
    updating the as-designed geometric ply definitions.

10. The method of claim 9 wherein the customized software program is used with a computer aided design (CAD) software program.

11. The method of claim 9 wherein the results relating to manufacturing implementation comprise characteristics selected from the group comprising stress, density, porosity, appearance, and actual thickness versus designed thickness.

12. The method of claim 9 wherein the composite structure is used in aircraft, spacecraft, watercraft, military craft, automobiles, trucks, buses, ships, rotor blades for aircraft, rotor blades for power generation, and bridges.

13. The method of claim 9 wherein the using the customized software program to evaluate and visualize potential impact of the data product step comprises using the customized software program to evaluate and visualize gaps and overlaps within the as-manufactured ply definitions.

14. A method using a computer for analyzing interactions of plies in a composite structure, comprising the steps of:
  inputting as-designed theoretical ply definitions into a computer aided manufacturing software program to generate output data comprising tape or tow course definitions of a plurality of plies;
  programming the tape or tow course definitions in the computer aided manufacturing (CAM) software program to produce a plurality of as-manufactured ply definitions;
  using the computer aided manufacturing (CAM) software program to generate an accumulated dataset of as-manufactured ply definitions;
  inputting the dataset into a customized software program to obtain one or more characteristics relating to manufacturing implementation of the as-manufactured ply definitions;
  using the customized software program to evaluate and visualize potential impact of the manufacturing implementation in terms of the one or more characteristics;
  using the customized software program to interrogate the one or more characteristics in order to enhance design, analysis and manufacture of the composite structure; and,
  using the customized software program to evaluate the as-manufactured ply definitions against actual tape or tow course distribution occurring at a ply level in relation to all plies above and below the ply level in a composite stack.

15. The method of claim 14 further comprising after the using the customized software program to evaluate and visualize step, the step of using the customized software program to analyze interactions of the as-manufactured ply definitions in a composite stack.

16. The method of claim 14 further comprising after the using the customized software program to evaluate and visualize step, the step of using the customized software program to determine any detrimental effects resulting from random concentrations of allowable manufacturing deviations in a composite stack containing a plurality of plies.

17. The method of claim 14 further comprising after the using the customized software program to evaluate and visualize step, the step of using the customized software program to visualize a simulation of a build process of the composite structure at a detailed ply level.

18. The method of claim 14 wherein the characteristics are selected from the group comprising stress, density, porosity, appearance, and actual thickness versus designed thickness.

* * * * *